United States Patent [19]

Shevlin

[11] 4,398,931
[45] Aug. 16, 1983

[54] CERAMIC FABRIC FILTER

[75] Inventor: Thomas S. Shevlin, White Bear Lake, Minn.

[73] Assignee: Minnesota Mining and Manufacturing Company, St. Paul, Minn.

[21] Appl. No.: 379,720

[22] Filed: May 19, 1982

[51] Int. Cl.³ .......................................... B01D 46/00
[52] U.S. Cl. .................................. 55/341 R; 55/302; 55/379; 55/381; 55/523; 55/525; 55/520; 55/DIG. 45; 210/497.1
[58] Field of Search ................ 55/302, 378, 379, 381, 55/382, 498, 341 R, 520, 523, 525, DIG. 45; 210/497.1, 493.4

[56] References Cited

U.S. PATENT DOCUMENTS

| | | | |
|---|---|---|---|
| 3,513,638 | 5/1970 | Young | 55/302 |
| 3,535,852 | 10/1970 | Hirs | 55/302 |
| 3,884,659 | 5/1975 | Ray | 55/379 |
| 4,149,863 | 4/1979 | Ballard | 55/379 |
| 4,243,715 | 1/1981 | Gordon | 55/527 |
| 4,259,095 | 3/1981 | Johnson | 55/302 |
| 4,270,935 | 6/1981 | Reinauer | 55/302 |

OTHER PUBLICATIONS

Battista-Synthetics in Papermaking Interscience Publishers-Div. John Wiley & Sons, N.Y. 6/23/64.

*Primary Examiner*—Bernard Nozick
*Attorney, Agent, or Firm*—Cruzan Alexander; Donald M. Sell; Lorraine R. Sherman

[57] ABSTRACT

A filter assembly for removing particulate matter from high temperature gas streams is disclosed, said filter assembly comprising:

a rigid, tubular frame or cage made of high temperature stable material, having a closed lower end, or optionally an open lower end, and adapted to be connected to a gas compartment at its open upper end, the cage having openings to provide at least 40 percent open area on its lateral surface, with each opening having an area of less then 125 square millimeters, a filter element surrounding said cage and comprising a conformable, fabric tape of woven ceramic fibers tightly spiral-wound in an over-lapped wrap about the lateral surface of the cage, said filter element being a gas permeable, rigid, seamless, tubular structure having at least one open end, and a clamping means for securing the filter element to the lower end of the cage, the clamping means optionally forming an end cap for the lower end of the filter.

20 Claims, 4 Drawing Figures

CERAMIC FABRIC FILTER

TECHNICAL FIELD

This invention relates to a filter assembly containing a high temperature filter comprising a ceramic fabric filter element and a support therefor. In another aspect, it relates to a high temperature filter.

BACKGROUND ART

A filtering apparatus having a multiplicity of tubular filter bags mounted in a filter housing is known in the art and commonly called a "baghouse". Each filter bag, generally made of gas permeable, woven inorganic or organic materials, has a tubular supporting frame or cage therein which holds the filter bag in an open tubular configuration. A gas stream laden with particulate matter flows into the bag and the particulate matter gradually becomes trapped or deposited on the exterior surface of the filter bag, due to the flow of gas from the outside to the inside of the filter bag. The particulate is not so trapped initially since the pores in the woven material are usually many times the size of the particulate separated. When the particulate laden gases first pass through the woven material or fabric, the efficiency of separation is low until enough particulate has been trapped to form a "precoat" on the fabric. With particulates frequently encountered in industrial processes, the precoat layer will normally form in a matter of seconds. Once the precoat layer is formed, the efficiency of separation of the particulate from the gas stream will usually be better than 99 percent, i.e., about 99 percent of the particulate is removed from the gas stream. With the passage of time, as a result of particulate accumulating on the surface of the filter bag, the gas flow pressure drop across the filter bag gradually increased and the efficacy of the filter assembly decreases.

Efficiently operating, woven fabric, baghouse filters generally have a gas flow pressure drop of 2 to 6 inches (5 to 15 cm) of water and are rated at 1 to 8 cubic feet per minute per square foot (3.2 to 24.2 liters per minute per $dm^2$) of fabric area. As the particulate layer builds up on the filter fabric, the pressure drop across the filter increases and it becomes necessary to clean the filter bag to dislodge the accumulated particulate therefrom. A manometer connected across the filter bag is used to determine when the filter should be cleaned. The cleaning can be automatically performed, either by mechanical shaking or reverse jet flow. The interval between cleanings can be from a few minutes to hours depending upon the rate of collection of particulate on the filter fabric. In a baghouse cleaning operation, where a section of filters can be removed from operation by means of automatic dampers, the cleaning operation can be performed in a matter of seconds, e.g., 2 to 10 seconds.

The presence of particulate within the filter bag fabric causes abrasive wear of the filter bags during cleaning and results in a shortened useful life. Any movement of the filter bag material, particularly adjacent sewn seams, and especially when loaded with an abrasive particulate increases the rate of the abrasive action, particularly on inorganic fibers which are inherently highly susceptible to abrasive wear. A support cage for the filter bag which has excessively large openings will permit undue flexing of the fibers in the filter fabric during cleaning. Thus, the basic form and structure of the filter bag and filter bag cage are critical factors in extending filter service life, especially when used for the removal of highly abrasive particulate in a corrosive gas, under which conditions a filter bag may wear out in a matter of weeks and need replacement.

The prior art has recognized the problem of cleaning bag filters and the problem of filter fabric wear by abrasion. U.S. Pat. No. 4,259,095 discloses support-diffuser tubes for improved support and particulate cleaning of filter bags which are subjected to cleaning by a pulse of reverse purge air. U.S. Pat. No. 4,149,863 discloses a fiberglass cloth bag filter over a wire mesh cage, the bag being cleaned by reverse blasts of air. Glass fiber and the mesh support are alleged to overcome problems of the art relating to synthetic fiber type bag filters failing at elevated temperatures in corrosive environments. U.S. Pat. No. 3,884,659 discloses a flexible filter media bag in slack position over a cylindrical wire cage, the bag being cleaned by a reverse jet air blast which causes the bag to inflate and snap away from the cage so as to dislodge accumulated solids from the filter media.

Synthetic organic and glass fiber fabric bag filters have been used in the art in baghouse applications. It is known that many synthetic organic fabrics deteriorate at temperatures above 300° C. and glass fiber deteriorates above 450° C.

The present society's need for energy conservation has made it desirable to reclaim waste heat from power plants using fossil fuels. It is necessary to remove particulate matter from gas streams exiting from these plants, the gases often being at a temperature in the range of 700° to 1000° C., before sending the hot gas through an expansion or combustion turbine which is used in the production of steam for producing electrical energy. Fabrics used in prior art filters, such as glass fiber materials, cannot withstand these high temperatures. Further, fabrics which can withstand the higher temperatures deteriorate due to the abrasive character of some particulate matter and the flexing of the fibers during filtration and during cleaning of the filter by reverse air jet blasts.

DISCLOSURE OF THE INVENTION

Briefly, the present invention provides a filter assembly for removing particulate matter from high temperature gas streams and is suitable for cleaning by a periodic reverse purge of air, the filter assembly comprising:

a rigid, tubular frame or cage made of high temperature stable material, e.g. steel, with a closed lower end, a lower end having openings therein, or optionally an open lower end, and adapted to be connected to a gas compartment by fastening means at its open upper end, said cage having perforations or open areas to provide at least 40 percent lateral (peripheral) open area, with each perforation having an area of less than 125 square millimeters, a filter element surrounding said cage comprising a pliable, conformable, fabric tape (preferably having a selvedge thereon) of woven ceramic fibers tightly spiral-wound in an over-lapped wrap about the lateral (peripheral) surface of said cage, said filter element being a gas permeable, seamless, tubular structure having at least one open end, and a clamping means for securing said filter element to the lower end of said cage, said clamping means optionally including means forming an end cap for the lower end of the resulting filter.

Generally, both ends of the filter element are open but the lower end may be closed, either by wrapping of a fabric tape (as where the cage has a conical shape) or by means of a sheet-like piece of fabric of woven ceramic fibers (as where the cage has a perforated base on its lower end, not a preferred embodiment).

As used in this application:

"selvedge" means the edge on either side of a woven or flat-knitted fabric, the edge so finished as to prevent raveling;

"tape" means a comformable and pliable strip or band;

"spiral-wound" relates to advancement to higher levels through a series of cyclical movements;

"over-lapped wrap" means spiral wound so as to extend over and partially cover the previous winding, e.g., about ½ inch (1.27 cm) on a 2 inch (5.1 cm) wide tape;

"fiber" means a filament structure having a length of at least 100 times its diameter;

"continuous fiber" means a fiber which has infinite length compared to its diameter, as described in U.S. Pat. No. 4,047,965;

"filter fabric" is a woven ceramic fiber fabric, which may have any desired weave, such as twill, drill, etc.;

"cage" is a supportive framework of any desired configuration having open work on its sides such as a skeletal frame or perforated sleeve;

"filter" means a filter element in the form of a fabric tape and the cage on which it is wound, the cage being open on at least one end;

"filter element" means a filter fabric tape that has been wound on a cage into an elongated, tubular shape, the wound tape being supported by the cage in a rigid configuration;

"filter assembly" means a filter and collar adapted to be placed in a gas separator plate of a filter housing;

"conformable" means can be wrapped around the cage of a filter in adjacent fashion so as to correspond in general shape to the cage, the resulting structure being rigid;

"lateral surface" means the sides of a cage and does not include the top and bottom;

"roving" means an assembly of one or more strands of ceramic fibers without twist;

"strand" means a plurality of fibers;

"tubular" means a shape that is cylindrical, conical, box-like, or any variation of these shapes;

"non-vitreous" material is one that is not derived from a melt; and

"ceramic metal oxides" means metal oxides which can be fired into a rigid or self-supporting polycrystalline form and are stable in a normal air environment, e.g., 23° C. and 50 percent relative humidity.

The present invention provides chemically inert fabric filters which maintain their integrity for prolonged periods at temperatures up to 1150° C. and for at least short periods at temperatures up to 1400° C., and which are able to withstand reverse jet blast cleaning without deterioration.

The filter of the present invention is useful in removing particulate matter from hot gas streams, particularly in a "baghouse" assembly, and has the following characteristics:

(1) the filter material is stable at high temperatures, i.e., 700° to 1400° C.;

(2) the filter fabric can be formed into a filter media;

(3) the formed filter (e.g., woven fabric plus cage) resists disintegration from mechanical forces when in use; and (4) the filter fabric has a long life.

The filter assembly of the present invention comprises elongated tubular filters for filtering particulate material which is entrained in a hot gas stream. Particulate laden gas can be directed into the filter housing and flows through the gas permeable filter elements while the particulate material is filtered and retained on the exterior surface of the filter elements. Periodically, a reverse purge of air can be directed into the upper end of the tubular filters for dislodging the trapped particulate material from the outer surface of the filter elements, thus cleaning the filters.

The present invention overcomes problems of prior art filter bags which need frequent replacement and which cannot be used at high temperatures. Because the seamless, ceramic fiber filter element is immobilized on the cage in a rigid configuration, abrasion of the filter element is minimized because of the lack of flexing of the filter fabric and absence of seams, flexing and seams being major reasons for failure of prior art filter bags.

DETAILED DESCRIPTION

Figure 1:
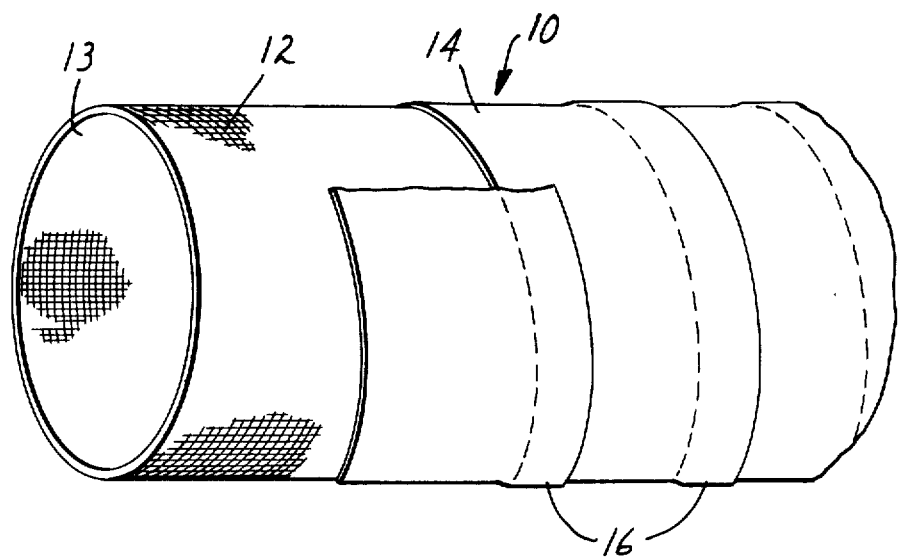
FIG. 1 is a perspective view of the upper end of one embodiment of a filter of the present invention, parts thereof being broken away.
Figure 4:
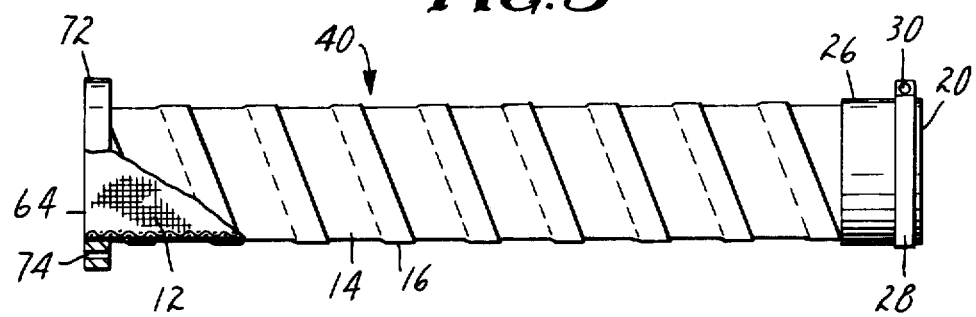
FIG. 4 is an elevational view of one filter of FIG. 3, parts thereof broken away and shown in section.

Referring to FIGS. 1 and 4 of the drawing, one embodiment 10 of the filter of the present invention is shown. Tubular cage 12 is made of wire screen and has an open upper end 13. Ceramic fabric tape 14 is spiral-wound about the lateral surface of cage 12 so as to form an overlap 16 and provide a tubular, gas permeable conformed, substantially rigid filter 10. Tape 14 would normally be wrapped around all of cage 12, but in FIG. 1 it is shown only partially wrapped around the cage so as to show the nature of the cage's lateral surface.

Figure 2:
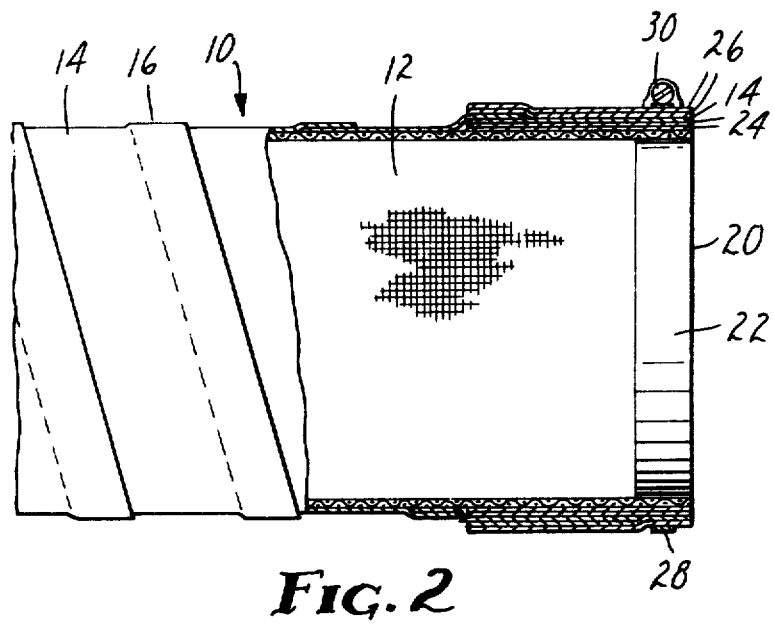
FIG. 2 is a side elevational view of one embodiment of a filter assembly of this invention, parts thereof being broken away and shown in section, showing a clamping means at its lower end.

FIG. 2 shows parts of filter 10, including lower end 20 having tightly-fitting end cap 22, to close the end of filter 10. The lower end portion of cage 12 is evenly wrapped with a multiplicity of ceramic fabric tape windings 24 which serve to support and cushion the lower portion of filter 10. Ceramic fabric tape 14 is spirally-wound about windings 24 and the remainder of the lateral surface of cage 12. The lower end portion of cage 12, and the lower end portion of wound tape 14 are evenly over-wrapped with a multiplicity of ceramic fabric tape windings 26 to anchor tape 14 firmly in place. Clamping band 28 surrounds the lower end of windings 24, 14, and 26 and is tightly secured thereto by tightening bolt 30.

Figure 3:
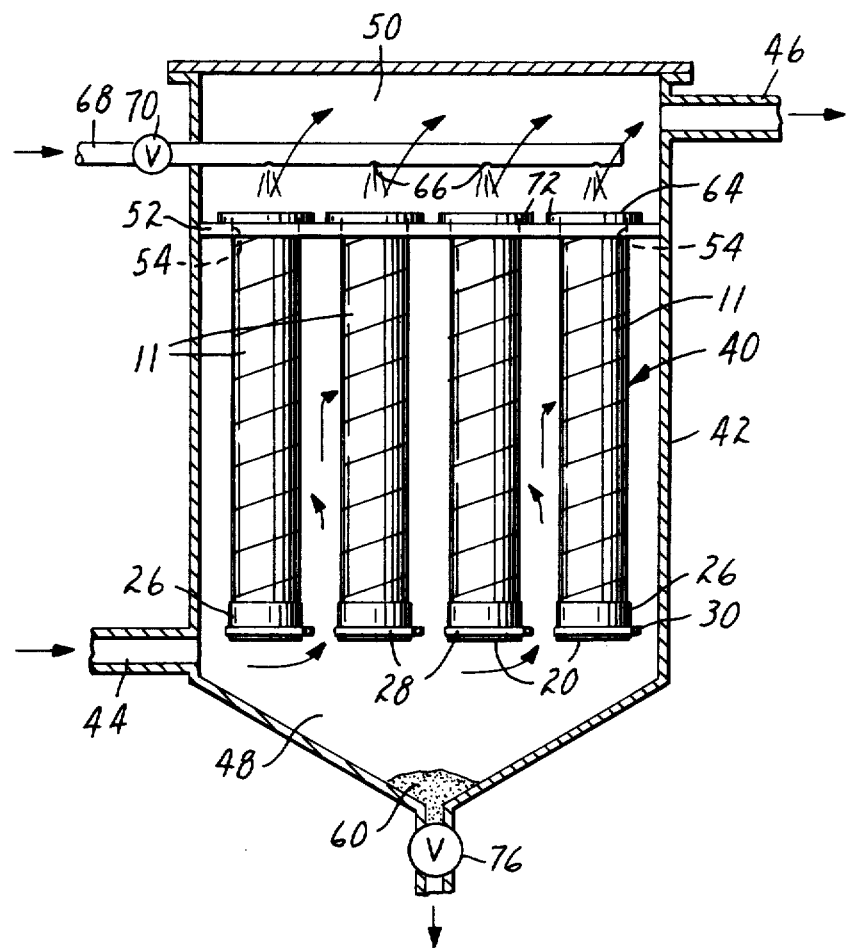
FIG. 3 is a cross-sectional view of a housing containing a plurality of filter assemblies.

FIG. 3 shows housing 42 for a plurality of filter assemblies 40 having inlet 44 for particulate bearing gas and outlet 46 for clean gas therefrom. Housing 42 is divided into inlet and outlet compartments 48 and 50 by gas separator plate or tube sheet 52 which has a series of apertures 54 therein. Arrows inside housing 42 show the direction of gas flow during the operating cycle. Into each aperature 54 of gas tube sheet 52 is fitted filter assembly 40 having lower end 20 closed by end cap 22 and upper open end 64. The upper open ends 64 are below openings 66 of compressed air line 68 so as to receive, during a cleaning cycle, a blast of compressed air, controlled by valve 70, therefrom. During the cleaning cycle, particulate matter is dislodged from the exterior surface of filter element 11 and falls to the bottom of housing 42 from where it accumulates as pile 60 which can be removed periodically through valve 76.

FIG. 4 shows filter assembly 40 which has collar 72 fastened thereto by any convenient means, such as clamping. Collar 72 has holes 74 radially disposed therein for insertion of fastening means, such as bolts, to affix collar 72 to gas tube sheet 52.

The ceramic fabric tape which makes up the filter element of the present invention comprises woven strands of ceramic fibers, each of which may be made of the same or different continuous ceramic fiber or a blend of two or more kinds of continuous ceramic fibers. Strands of ceramic fiber are made into a pliable fabric tape and may contain one or more of the above-mentioned fibers; the fibers may be twisted, twistless, false-twisted, tangled, or spun staple fibers. The ceramic fiber strands comprise inorganic fibers such as Astroquartz ® continuous fused silica fibers, and particularly useful are non-vitreous ceramic fibers such as Nicalon ® silicon carbide fiber (Nippon Carbon, Ltd., Japan) or fibers of ceramic metal oxide(s) (which can be combined with non-metal oxides, e.g., $SiO_2$) such as thoria-silica-metal (III) oxide fibers (see U.S. Pat. No. 3,909,278), zirconia-silica fibers (see U.S. Pat. Nos. 3,793,041 and 3,709,706), alumina-silica fiber (see U.S. Pat. No. 4,047,965) graphite fiber, alumina-chromia-metal (IV) oxide fiber (see U.S. Pat. No. 4,125,406), titania fibers (see U.S. Pat. No. 4,166,147). The filter element can also be made of refractory metal wire (such as nickel-chrome alloys). Preferably, the ceramic fiber tape comprises continuous alumina-boria-silica ceramic fibers (such as those sold under the trademark Nextel ® 312 ceramic fiber), having an alumina:boria mol ratio of 9:2 to 3:1.5, and containing up to 65 weight percent silica, preferably 20 to 50 weight percent silica, as described in U.S. Pat. No. 3,795,524. Nextel 312 ceramic fiber is a roving of a commercially available fiber described in 3M Bulletins, e.g., N-MHFOL(79.5)MP, N-MPBFC-2(109.5)11, N-MPBVF-1(89.5)11, N-MTDS(79.5)MP, N-MPBBS-(89.5)11, and N-MOUT(89.4)MP.

The ceramic fabric tape may be of any preselected width and thickness. Preferably, the width is in the range of 1.0 to 15 cm, with a thickness in the range of 0.5 to 1.0 mm so as to provide a pressure drop across the filter fabric of about 0.1 inch (0.25 cm) of water, which does not interfere with filter performance. The overlap is generally in the range of 0.25 to 7.5 cm. Most preferably the ceramic fabric tape is 5.0 to 10 cm in width with a 0.5 inch (1.27 cm) overlap when wrapped. A particularly useful ceramic tape, as shown in FIG. 1, is 6.35 cm wide and is wound with a 0.5 inch (1.27 cm) overlap.

The filter of the present invention is formed by spirally winding the above-described pliable tape under tension on a rigid cage. The tension is sufficient so that the lateral movement of the filter element during the filtering or cleaning cycle at any point is less than 2 mm, and preferably less than 1 mm, from the surface of the cage. Preferably, the cage is of elongated, generally cylindrical shape, but any desired shape is envisioned within the scope of the present invention, open on at least one end and capable of being connected to a gas separator plate by suitable collar or clamping means, for example, a compression ring clamp such as an airplane clamp. The cage has an open upper end. It can have a solid lower end, a lower end having perforations or open areas therein, or it can be open at its lower end and closed by means of an end cap. The filter element is a gas permeable, conformed structure in a rigid configuration.

The cage has open work formed by cribriform or is in the form of a screen and comprises 40 to 90 percent, and preferably 75 to 85 percent or more, open areas or perforations, with any single perforation having an area of less than 125 square millimeters. High open area cages typically are screens (65–90 percent open areas), and for example, a screen with 8 mm openings (maximum distance across opening) using 1.85 mm diameter wire has about 81 percent open areas. The screen structure is also preferred because of the uniformity of support it provides to the fabric of the formed filter, having no large areas which would be more susceptible to potential flexing. It is preferred that the maximum distance across cage open areas should be less than about 12 mm and preferably in the range of 4 to 8 mm. Openings with maximum distance across of less than 1 mm are generally not efficient. Whereas the wire screens have open areas of 65 percent or more, perforated or expanded metal cages may have only 40 percent or more open areas. As with the screens, the openings are preferred in the 4–8 mm size range. The cage may be constructed of any high temperature stable material such as metals or ceramics capable of withstanding temperatures up to 1400° C. or more. Particularly useful materials are super alloy metals such as stainless steel, Stellite ®, Inconel ®, or ceramics such as alumina, mullite, stabilized zirconia, silicon carbide, steatite, or spinel.

The filter of the present invention is useful in any application requiring filtration of suspended or dispersed particulate matter from a high temperature gas steam, e.g. combustion gases, where long term temperatures up to 1150° C. and short term temperatures up to 1400° C. or more are encountered. Such filters are useful, for example, in baghouse assemblies of power plants that burn fossil fuels, industrial incinerators, and smelters. The filter element, supported in a rigid manner by the cage, resists mechanical abrasion during cleaning and does not require frequent replacement.

Objects and advantages of this invention are further illustrated by the following examples, but the particular materials and amounts thereof recited in these examples, as well as other conditions and details, should not be construed to unduly limit this invention.

EXAMPLES

Runs were made in which two filters, (A) and (B), made of two different fabrications of Nextel ® ceramic fibers were compared for durability when subjected to gentle cleaning pulses applied each one-half minute.

Filter (A) was a spiral wrapping of 2½ inch wide (6.35 cm) twill weave tape of Nextel 312 ceramic fibers with a ½ inch (1.27 cm) width overlap on a 3.25 inch (8.25 cm) diameter perforated 20 gauge (0.95 mm thick), 12 inch (30.5 cm) long, steel cage with a 3/16 inch (0.476 cm) diameter holes to provide about a 50 percent open support cage, the filter element being clamped to the cage at top and bottom, and Filter (B), a laboratory model of that used by the industry for filtering particulate (fly ash) in the flue gas from a coal-fired electrical generating plant, was a sewn 8-harness twill weave fabric bag of Nextel 312 ceramic fiber having a 3½ inch (8.9 cm) diameter, with a sewn side seam, surrounding six 3/16 inch (0.48 cm) diameter steel rods arranged vertically as supporting elements on a 3.25 inch (8.24 cm) diameter plate to provide a wire cage. The fabric bag was clamped to a 3.25 inch (8.25 cm) diameter tube at the top, and a 3.25 inch (8.25 cm) diameter, ¾ inch (1.90 cm) long, closed end, squat floating cylinder at the bottom.

Filters (A) and (B) were suspended individually in a cylindrical test chamber approximately 15.5 cm in diameter made of Plexiglass ® acrylic. About ¼ liter of fly ash from a coal-burning public utility power plant, was placed on the bottom of the test chamber and blown around vigorously to penetrate the fabric filter element of each filter. The continuous flow through each filter was approximately 6 to 10 air cubic feet per minute (4.73 liters/sec.). The airflow to cloth ratio was approximately 7.5 to 12.5 ft./sec. (135–230 meters/min.).

The filter elements in the run were cleaned every 30 seconds by "reverse jet pulse cleaning". An 80 psi (5.62 kg/cm$^2$) reservoir was pulsed for 0.25 sec. through Goyen valves (an industry standard), Goyen Industries, each ½ minute into each filter providing a cleaning impulse. The filter bag on Filter (B) expanded in response to the cleaning pulse which removed the cake from the bag. The filter fabric on Filter (A) was essentially immobile in response to the cleaning pulse which removed the cake from the filter element.

After 20 days and 56,000 pulse cycles, a 4" (10 cm) long tear appeared next to the vertical seam in the sewn bag of Filter (B). The run was stopped. No wear was evident on the spiral wrapping of Filter (A).

The run demonstrated that the spiral-wrapped ceramic filter element of Filter (A), supported in a rigid manner by the cage, was an effective filter and was a more durable configuration than the more flexible sewn bag of Filter (B).

Various modifications and alterations of this invention will become apparent to those skilled in the art without departing from the scope and spirit of this invention, and it should be understood that this invention is not to be unduly limited to the illustrative embodiment set forth herein.

I claim:

1. A filter comprising:
    a rigid, tubular frame or cage made of high temperature stable material, having an upper end and a lower end, said upper end being open, said cage having openings to provide at least 40 percent open area on its lateral surface, with each opening having an area of less than 125 square millimeters, and
    a tubular, seamless filter element surrounding said cage and comprising a conformable, fabric tape of woven ceramic fibers and tightly spiral-wound in an over-lapped wrap about the lateral surface of said cage, said filter element being a gas permeable structure having at least one open end,
    the resultant filter being a gas permeable, rigid structure having at least one open end and suitable for high temperature filtering applications.

2. The filter according to claim 1 wherein said cage is made of metal screen.

3. The filter according to claim 1 wherein the integrity of said filter is maintained up to 1150° C.

4. The filter according to claim 1 wherein said ceramic fibers are selected from the group consisting of continuous fused silica, alumina-silica, zirconia-silica, alumina-chromia-metal (IV) oxide, titania, thoria-silica-metal (III) oxide, graphite, silicon carbide, and alumina-boria-silica fibers.

5. The filter according to claim 1 wherein said ceramic fibers are alumina-boria-silica ceramic fibers.

6. The filter according to claim 1 wherein said ceramic fibers are alumina-silica.

7. The filter according to claim 1 wherein said lower end of said cage is closed.

8. The filter according to claim 1 wherein said lower end of said cage is open.

9. A filter assembly comprising:
    a rigid, tubular frame or cage made of high temperature stable material, having an upper end and a lower end, and adapted to be connected to a gas compartment at its open upper end, said cage having openings to provide at least 40 percent open area on its lateral surface, with each opening having an area of less than 125 square millimeters,
    a filter element surrounding said cage and comprising a conformable, fabric tape of woven ceramic fibers tightly spiral-wound in an over-lapped wrap about the lateral surface of said cage, said filter element being a gas permeable, rigid, seamless, tubular structure having at least one open end, and
    a clamping means for securing said filter element to the lower end of said cage, said clamping means optionally forming an end cap for the lower end of the resulting filter.

10. The filter assembly according to claim 9 wherein said ceramic fibers are selected from the group consisting of continuous fused silica, alumina-silica, zirconia-silica, alumina-chromia-metal (IV) oxide, titania, thoria-silica-metal (III) oxide, graphite, silicon carbide, and alumina-boria-silica fibers.

11. The filter assembly according to claim 9 wherein said ceramic fibers are alumina-boria-silica ceramic fibers.

12. The filter assembly according to claim 9 wherein said ceramic fibers are alumina-silica.

13. The filter assembly according to claim 9 wherein said assembly is part of a baghouse filter assembly.

14. The filter assembly according to claim 7 wherein said lower end of said cage is closed.

15. The filter assembly according to claim 9 wherein said lower end of said cage is open.

16. A filter assembly for cleaning by a periodic reverse purge of air, comprising:
    a rigid, elongated, tubular metal cage having a lower end and an upper end, and connected to a gas compartment by fastening means at its open upper end, said cage having openings to provide at least 40 percent open area on its lateral surface, with each opening having an area of less than 125 square millimeters,
    a filter element surrounding said cage and comprising a conformable, selvedge fabric tape of woven alumina-boria-silica fibers tightly spiral-wound in an over-lapped wrap about said lateral surface of said metal cage, said tape having a width in the range of 1.0 to 15 cm and a thickness in the range of 0.5 to 1.0 mm, said overlap being in the range of 0.25 to 7.5 cm, and the resultant filter element being a gas permeable, rigid, tubular structure open at one end, said alumina-boria-silica fibers having an alumia:boria mol ratio of 9:2 to 3:1.5, and containing up to 65 weight percent of silica, and a clamping means for securing said filter element to said lower end of said cage.

17. The filter assembly according to claim 14 wherein the closed lower end of said cage has openings therein and said clamping means further secures a sheet-like piece of fabric of woven ceramic fibers over said lower end of said cage.

18. The filter assembly according to claim 16 wherein said lower end of said cage is closed.

19. The filter assembly according to claim 16 wherein said lower end of said cage has openings therein.

20. A filter comprising:

a rigid, tubular frame or cage made of high temperature stable material having a lower end and an open upper end, said cage having openings to provide at least 40 percent open area on its lateral surface, with each opening having an area of less than 125 square milimeters, and a tubular, seamless filter element surrounding said cage and comprising a conformable fabric tape of woven fibers of refractory metal wire and tightly spiral-wound in an over-lapped wrap about the lateral surface of said cage, said filter element being a gas permeable structure having at least one open end, the resultant filter being a gas permeable, rigid structure having at lest one open end and suitable for high temperature filtering applications.

* * * * *